(12) United States Patent
Ono et al.

(10) Patent No.: US 10,386,036 B2
(45) Date of Patent: Aug. 20, 2019

(54) VEHICLE BODY STRUCTURE

(71) Applicant: HONDA MOTOR CO., LTD., Minato-ku, Tokyo (JP)

(72) Inventors: Akira Ono, Wako (JP); Ryuya Kawaji, Wako (JP); Shunichi Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/033,245

(22) Filed: Jul. 12, 2018

(65) Prior Publication Data

US 2019/0041023 A1 Feb. 7, 2019

(30) Foreign Application Priority Data

Aug. 7, 2017 (JP) ................. 2017-152557

(51) Int. Cl.
| | |
|---|---|
| *F21V 31/03* | (2006.01) |
| *F21S 45/33* | (2018.01) |
| *F21S 45/37* | (2018.01) |
| *B60Q 1/26* | (2006.01) |
| *F21V 23/00* | (2015.01) |
| *F21S 43/00* | (2018.01) |
| *F21S 41/00* | (2018.01) |
| *F21S 45/00* | (2018.01) |

(52) U.S. Cl.
CPC ............. *F21S 45/33* (2018.01); *B60Q 1/26* (2013.01); *F21S 41/00* (2018.01); *F21S 43/00* (2018.01); *F21S 45/00* (2018.01); *F21S 45/37* (2018.01); *F21V 23/00* (2013.01); *F21V 31/03* (2013.01)

(58) Field of Classification Search
CPC .. F21S 45/33; F21S 45/00; F21S 41/00; F21S 43/00; F21S 45/37; F21V 23/00; F21V 31/03; B60Q 1/26
See application file for complete search history.

(56) References Cited

U.S. PATENT DOCUMENTS 5,702,173 A * 12/1997 Kawamura .......... B60Q 1/0041
362/505
9,879,841 B2 * 1/2018 Lee ......................... B60Q 1/04
(Continued)

FOREIGN PATENT DOCUMENTS

| CA | 2398959 A1 * | 8/2001 | .............. F21S 45/33 |
|---|---|---|---|
| EP | 2014973 A2 * | 1/2009 | .............. F21S 45/33 |

(Continued)

OTHER PUBLICATIONS

Japanese Office Action for Japanese Patent Application No. 2017-152557 dated Apr. 2, 2019.

*Primary Examiner* — Donald L Raleigh
(74) *Attorney, Agent, or Firm* — Amin, Turocy & Watson LLP

(57) ABSTRACT

A vehicle body structure includes a ventilation port through which air in an internal space of a lamp body enters and exits, a cap that covers the ventilation port, a waterproof wall that surrounds a periphery of the cap, and a water-resistant cover that covers an opening section of the waterproof wall, wherein the water-resistant cover includes a drain port further outside than the waterproof wall in a radial direction when seen in an axial direction of the waterproof wall.

6 Claims, 8 Drawing Sheets

(56) References Cited

U.S. PATENT DOCUMENTS

| | | | | |
|---|---|---|---|---|
| 2016/0084471 A1* | 3/2016 | Sander | .................... | F21S 45/43 |
| | | | | 362/547 |
| 2016/0109087 A1* | 4/2016 | Ito | .......................... | F21S 45/33 |
| | | | | 362/547 |
| 2017/0108192 A1* | 4/2017 | Dalal | ..................... | F21S 45/33 |

FOREIGN PATENT DOCUMENTS

| | | | | | |
|---|---|---|---|---|---|
| IT | 9067676 | * | 9/1990 | ............. | F21S 45/33 |
| JP | 2007-141629 | | 6/2007 | | |
| JP | 50-04182 | | 8/2012 | | |
| JP | 2016-046105 | | 4/2016 | | |
| JP | 2017073381 A | * | 4/2017 | ............... | B60Q 1/04 |
| JP | 2018098184 A | * | 6/2018 | ............. | F21V 31/03 |
| WO | WO-2018139760 A1 | * | 8/2018 | | |

* cited by examiner

VEHICLE BODY STRUCTURE

CROSS-REFERENCE TO RELATED APPLICATION

Priority is claimed on Japanese Patent Application No. 2017-152557, filed Aug. 7, 2017, the content of which is incorporated herein by reference.

BACKGROUND OF THE INVENTION

Field of the Invention

The present invention relates to a vehicle body structure.

Description of Related Art

As a vehicle body structure, a structure in which a cap is attached to a ventilation port formed in a headlight (hereinafter referred to as a lamp body) and a periphery of the cap is covered with a water-impermeable plate is known. When the periphery of the cap is covered with the water-impermeable plate, water can be received by the water-impermeable plate. Accordingly, direct contact of water with the cap can be prevented by the water-impermeable plate. Accordingly, it is possible to prevent the cap from directly coming in contact with water and the cap from being removed from the ventilation port (for example, see Japanese Patent No. 5004182).

SUMMARY OF THE INVENTION

In the vehicle body structure disclosed in Japanese Patent No. 5004182, only the periphery of the cap is covered with the water-impermeable plate, and a rear side of the cap is not covered. Meanwhile, some lamp bodies are provided at positions where water is splashed from behind the cap. In this case, providing a novel water-resistant cover to prevent water from directly coming in contact with the cap from behind the cap can be considered.

Here, when air enters and exits the internal space of the lamp body (ventilation), there is a need to form a gap between the water-resistant cover and the water-impermeable plate. Accordingly, it is conceivable that water will infiltrate into the gap between the water-resistant cover and the water-impermeable plate. For this reason, the water that has infiltrated from the gap may remain in the water-impermeable plate, the cap may be immersed in the remaining water, and the water may infiltrate into the lamp body from the ventilation port.

An aspect of the present invention is to provide a vehicle body structure capable of preventing water from directly coming in contact with a cap and further preventing water from infiltrating into a lamp body from a ventilation port.

(1) A vehicle body structure according to an aspect of the present invention includes a ventilation port through which air in an internal space of a lamp body enters and exits; a cap that covers the ventilation port; a waterproof wall that surrounds a periphery of the cap; and a water-resistant cover that covers an opening section of the waterproof wall, wherein the water-resistant cover comprises a drain port further outside than the waterproof wall in a radial direction when seen in an axial direction of the waterproof wall.

In this way, the opening section of the waterproof wall is covered with the water-resistant cover, and the drain port is formed in the water-resistant cover. The drain port is formed further outside than the waterproof wall in the radial direction. Accordingly, the water infiltrating into the space between the waterproof wall and the water-resistant cover can be discharged from the drain port. Accordingly, the water can be prevented from infiltrating into the lamp body from the ventilation port.

Here, the waterproof wall is formed to surround a periphery of the cap. In addition, the drain port is formed further outside the waterproof wall in the radial direction. Accordingly, the drain port is installed at a position separated from the cap. Accordingly, when water infiltrates into the space between the waterproof wall and the water-resistant cover from the drain port, the water that has infiltrated can be prevented from directly coming in contact with the cap.

(2) In the aspect of above mentioned (1), the water-resistant cover may include a shielding wall that covers the opening section of the waterproof wall; and a cylindrical wall extending from the shielding wall in the axial direction of the waterproof wall, and the drain port may be installed in the shielding wall.

In this way, the cylindrical wall is installed on the water-resistant cover, and the cylindrical wall extends in the axial direction of the waterproof wall. Accordingly, a labyrinth structure (a labyrinthine structure) is formed by the cylindrical wall, the shielding wall and the waterproof wall. Accordingly, infiltration of the water into the inside from the opening section of the waterproof wall can be minimized by the labyrinth structure.

In addition, the cylindrical wall extends from the shielding wall, and the drain port is installed in the shielding wall. Accordingly, the cylindrical wall is formed along the drain port, and an area in which the drain port is formed can be reinforced by the cylindrical wall. Accordingly, rigidity of the shielding wall (i.e., the water-resistant cover) can be secured by the cylindrical wall.

(3) In the aspect of above mentioned (2), the cylindrical wall may include a fixing section fixed to the lamp body, and the drain port may be installed at a different position from the fixing section in a circumferential direction.

In this way, the drain port of the shielding wall is installed at a different position from the fixing section in the circumferential direction. Accordingly, the fixing section continues from the cylindrical wall to the shielding wall in the circumferential direction. That is, the fixing section is strongly supported by the cylindrical wall or the shielding wall. Accordingly, in a state in which the water-resistant cover is attached to the lamp body (specifically, a housing of the lamp body), attachment rigidity of the water-resistant cover can be improved.

(4) In the aspect of above mentioned (2) or (3), the drain port may be installed at two places in an upper section and a lower section of the shielding wall.

Here, when lamp bodies are attached to a vehicle, in many cases, the lamp bodies are attached to both of left and right sides of the vehicle. When the lamp bodies are attached to both of the left and right sides of the vehicle, the water-resistant cover is preferably shared by the lamp bodies of both of the left and right sides. When the water-resistant cover is shared by the lamp bodies of both of the left and right sides, reduction in the number of parts or the like can be achieved.

Here, in the aspect of above mentioned (4), the drain port is installed at two places of the upper section and the lower section of the shielding wall. Accordingly, in a state in which the lamp body is attached to the vehicle on the left side, for example, the drain port of one of the upper section and the lower section can be disposed at a lower part. In addition, in a state in which the lamp body is attached to the vehicle on the right side, for example, the drain port of the other of the upper section and the lower section can be disposed at a lower part.

Accordingly, the water-resistant cover can be shared by the lamp body on the left side in the vehicle width direction and the lamp body on the right side in the vehicle width direction. Accordingly, reduction in the number of parts or the like can be achieved. Further, erroneous assembly of the water-resistant cover to the lamp body on the left side in the vehicle width direction and the lamp body on the right side in the vehicle width direction can be prevented.

In addition, as the drain port is installed at the two places of the upper section and the lower section of the shielding wall, the drain port on the lower side can be used for drainage, and the drain port on the upper side can be used for air intake. Accordingly, the water that has infiltrated into the water-resistant cover can be smoothly discharged to the outside of the water-resistant cover.

(5) In the aspect of any one of above mentioned (1) to (4), the ventilation port may be installed in a vicinity of an attachment/detachment section of a light source installed in the lamp body.

Here, the working hole for attachment and detachment of the light source of the lamp body is installed in the vehicle body. Here, in the aspect of above mentioned (5), the ventilation port is installed in the vicinity of the attachment/detachment section of the light source of the lamp body. Accordingly, maintenance/inspection (maintenance) of the water-resistant cover or the ventilation port can be easily performed using the working hole.

Meanwhile, as the ventilation port is installed in the vicinity of the attachment/detachment section of the light source, it is conceivable that the water that has infiltrated from the working hole will enter the internal space of the lamp body through the ventilation port. Here, the water-resistant cover is installed on the lamp body. Accordingly, the water that has infiltrated from the working hole can be prevented from entering the internal space of the lamp body by the water-resistant cover.

According to the aspect of the present invention, the opening section of waterproof wall is covered with the water-resistant cover, and the drain port is formed on the water-resistant cover. The drain port is formed further outside than the waterproof wall in the radial direction. Accordingly, the water from the ventilation port can be prevented from infiltrating into the lamp body.

In addition, the waterproof wall is formed to surround a periphery of the cap, and the drain port is formed further outside than the waterproof wall in the radial direction. Accordingly, the water can be prevented from directly coming in contact with the cap.

DETAILED DESCRIPTION OF THE INVENTION

Figure 1:
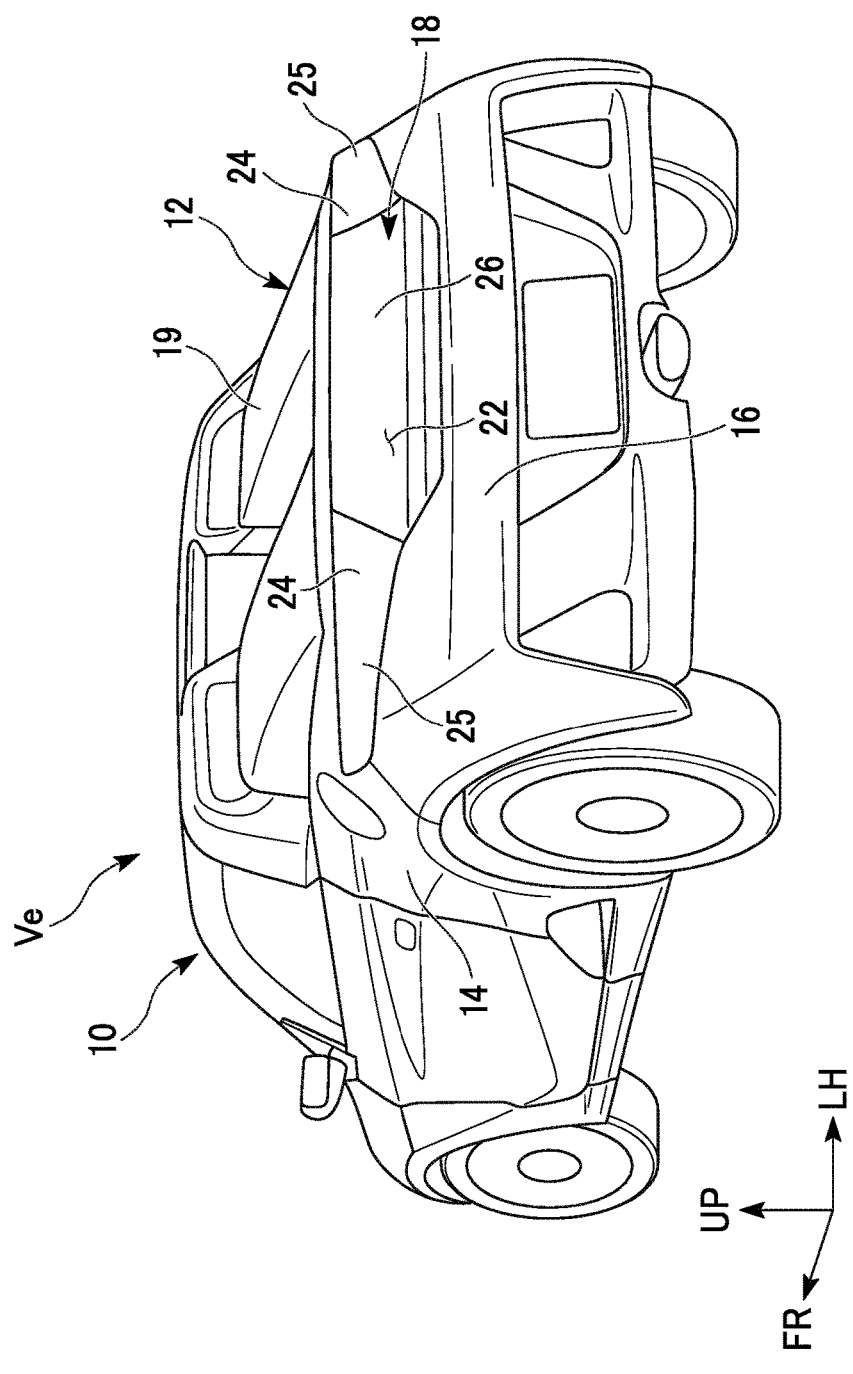
FIG. 1 is a perspective view showing a vehicle body rear structure including a back lamp according to an embodiment of the present invention.

An embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle.

For example, while a vehicle body rear structure 12 that constitutes a rear section of a vehicle body 10 is exemplified as a vehicle body structure in the following embodiment, there is no limitation thereto. As another example, the vehicle body structure may be, for example, a vehicle body front structure that constitutes a front section of the vehicle body 10.

As shown in FIG. 1, the vehicle body 10 includes the vehicle body rear structure 12 that constitutes a rear section of the vehicle body 10. The vehicle body rear structure 12 includes a left rear fender 14, a right rear fender (not shown), a bumper face 16, a rear combination lamp 18 and a rear lid 19.

Further, the vehicle body rear structure 12 has a substantially lateral symmetrical configuration. Accordingly, components on the left side and components on the right side are designated by the same reference signs, and the components on the left side will be described in detail with description of the components on the right side omitted. As an example, the rear combination lamp 18 is installed in a region surrounded by the left rear fender 14, the right rear fender and the bumper face 16. The rear lid 19 is attached to an upper side of the rear combination lamp 18.

The rear combination lamp 18 has a combination cover 22 that functions as an exterior part of a vehicle Ve. The rear combination lamp 18 is integrated with a brake lamp 24, a direction indicator 25, a back lamp (a back-up lamp) 26, or the like.

Figure 2:
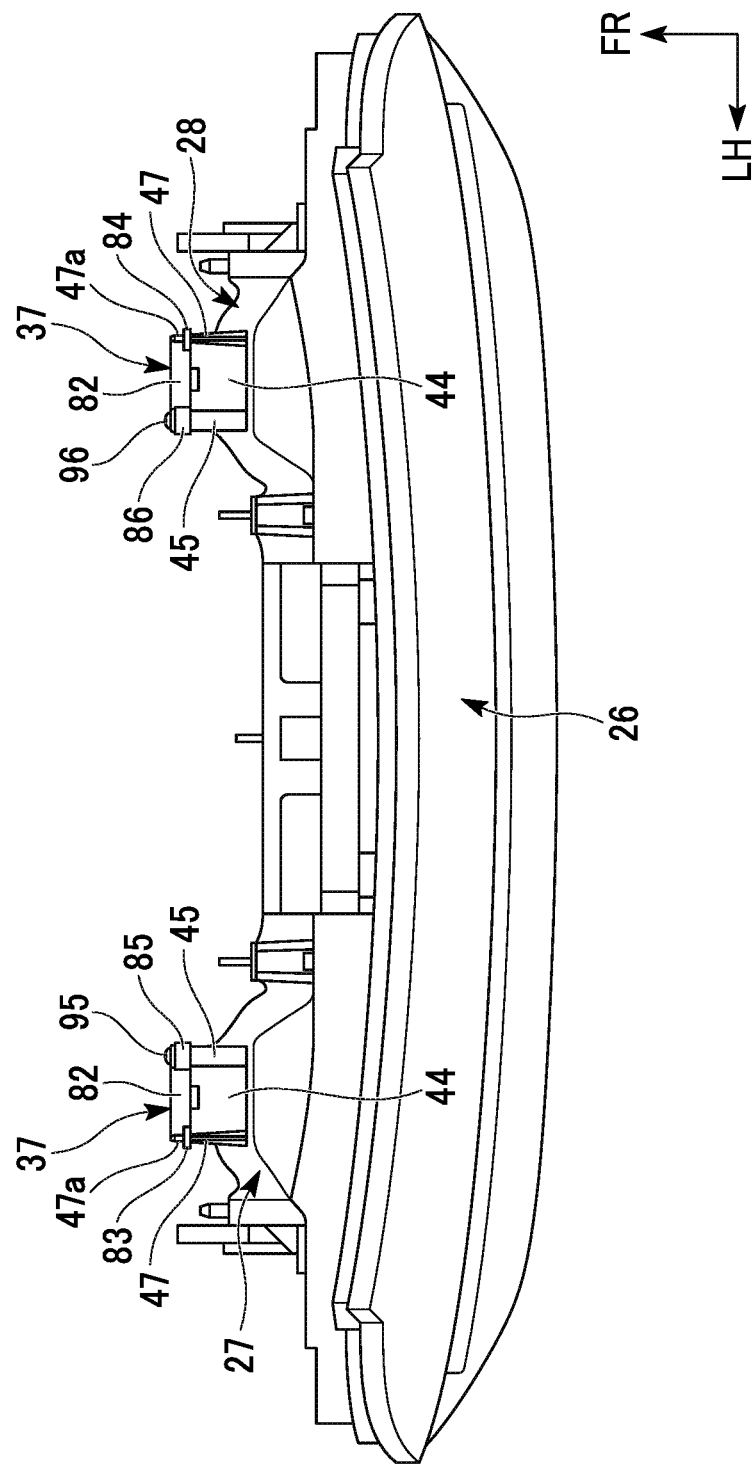
FIG. 2 is a plan view showing the back lamp in FIG. 1 according to the embodiment of the present invention.

As shown in FIG. 2, the back lamp 26 includes a left lamp body 27 in a vehicle width direction on the left side, and a right lamp body 28 in the vehicle width direction on the right side. The left lamp body 27 and the right lamp body 28 are laterally symmetrical to each other, the components of the right lamp body 28 are designated by the same reference numerals as those of the left lamp body 27, and detailed description of the right lamp body 28 will be omitted. Further, hereinafter, the left lamp body 27 will be described as "the lamp body 27."

Figure 3:
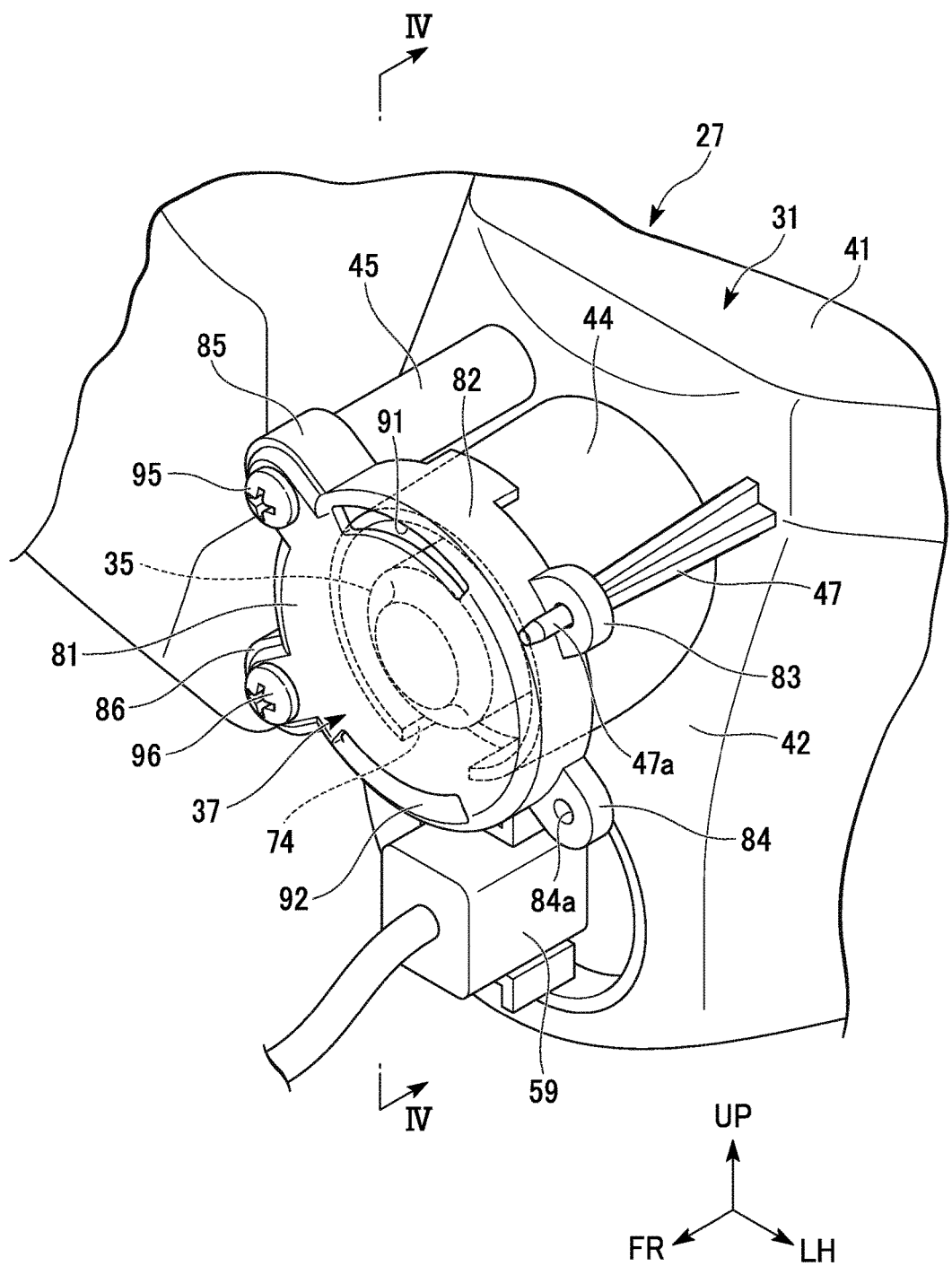
FIG. 3 is a perspective view showing a lamp body of the back lamp according to the embodiment of the present invention from the front of the vehicle body.
Figure 4:
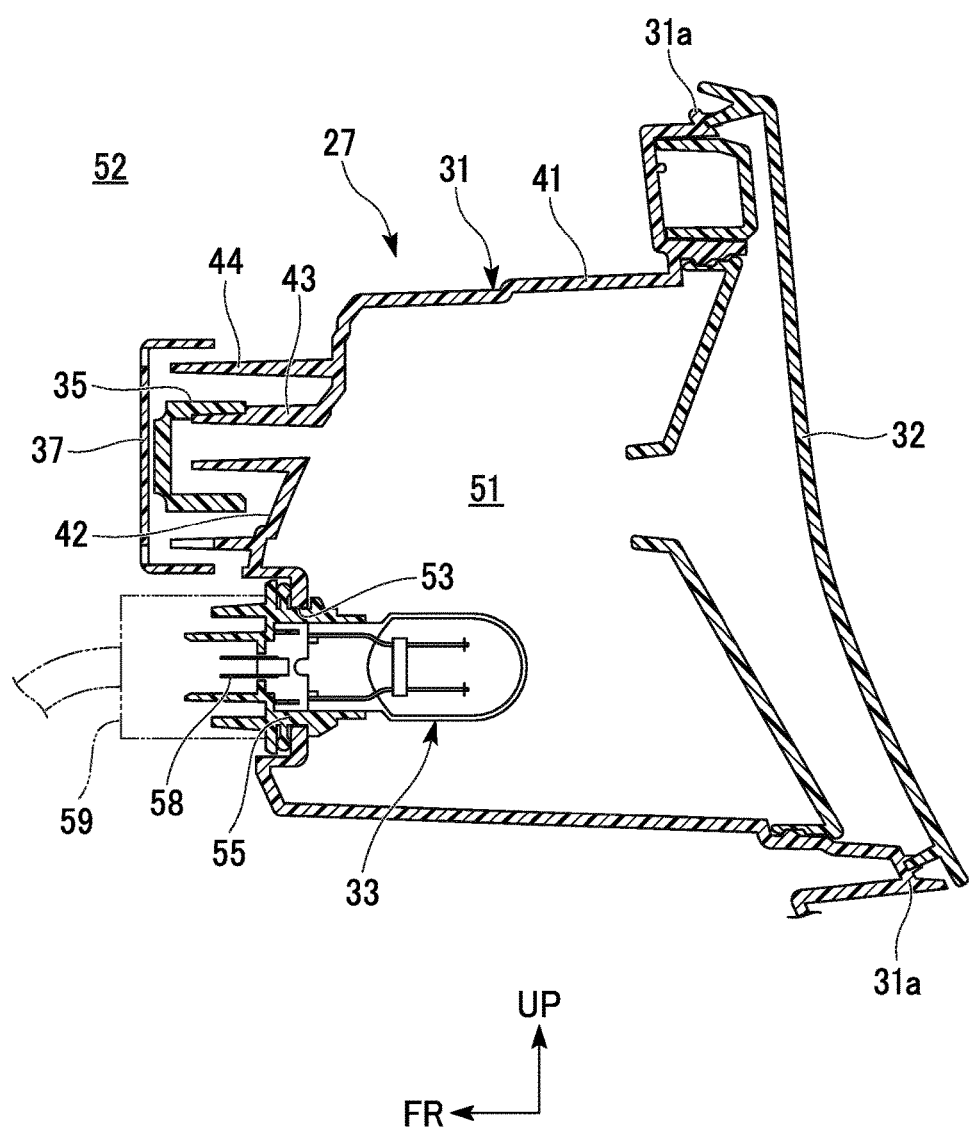
FIG. 4 is a cross-sectional view showing the lamp body in FIG. 3 according to the embodiment of the present invention taken along line IV-IV.

As shown in FIG. 3 and FIG. 4, the lamp body 27 includes a housing 31, an exterior cover 32, a light source 33, a cap 35 and a water-resistant cover 37. The exterior cover 32 is attached to an opening end portion 31a of the housing 31. As the exterior cover 32 is attached to the opening end portion 31a of the housing 31, the opening end portion 31a is covered with the exterior cover 32. The exterior cover 32 is an exterior cover that forms a central section of the combination cover 22 (see FIG. 1) in the vehicle width direction.

The housing 31 includes a housing outer circumferential wall 41, a housing wall section 42, a ventilation section 43, a waterproof wall 44, a pair of attachment bosses 45 and 46 (refer to FIG. 6 for 46), and a positioning protrusion 47. An internal space 51 of the lamp body 27 is formed by the housing outer circumferential wall 41, the housing wall section 42 and the exterior cover 32.

Figure 5:
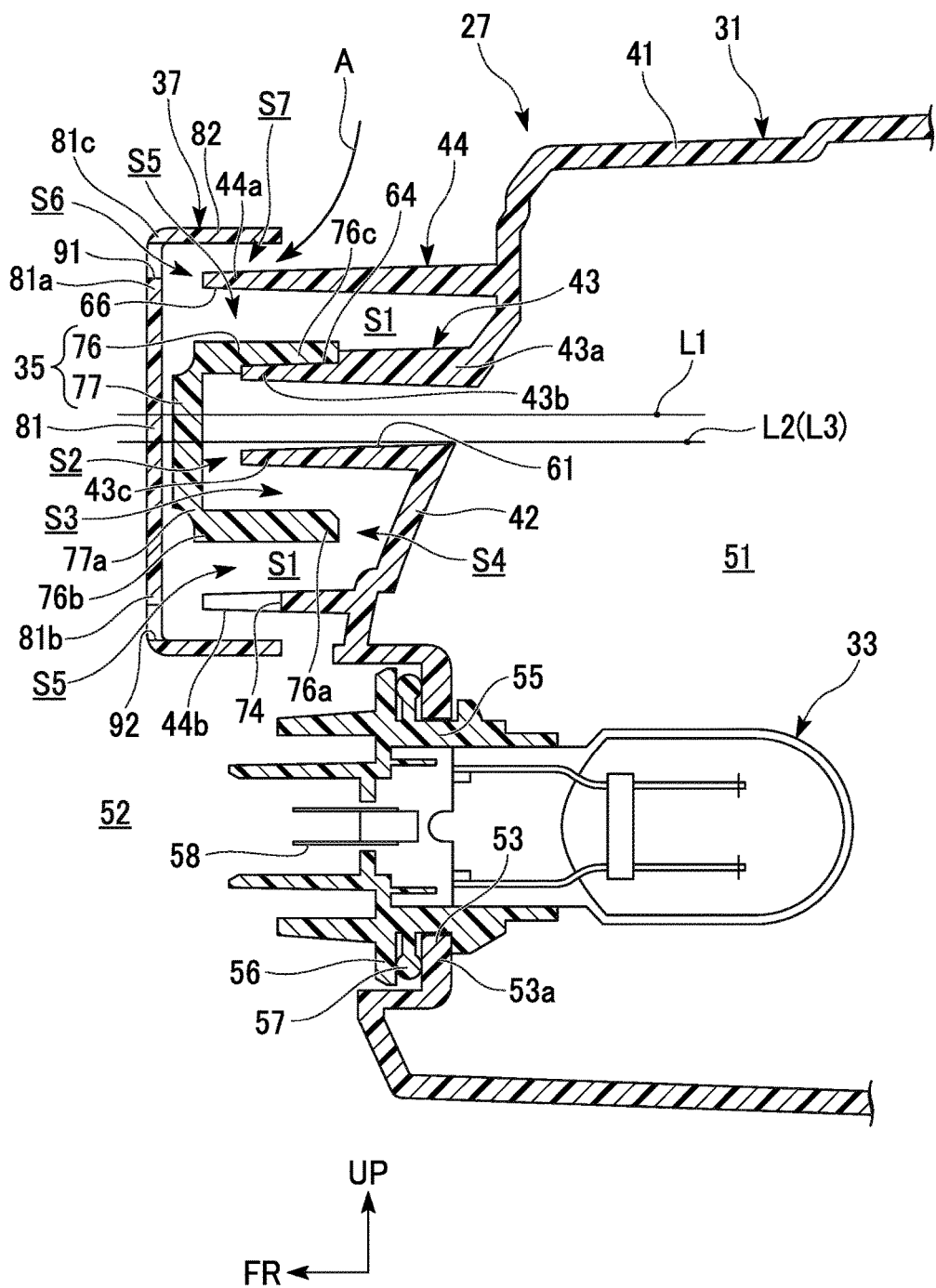
FIG. 5 is a cross-sectional view showing major parts of the lamp body in FIG. 4 according to the embodiment of the present invention.

As shown in FIG. 5, an attachment/detachment section 55 of the light source 33 is attached to an attachment port 53 of the housing wall section 42. A flange 56 is formed on the attachment/detachment section 55 of the light source 33, and a rubber packing 57 is attached along the flange 56.

As the light source 33 is attached to the attachment port 53 of the housing wall section 42, the rubber packing 57 is interposed between the flange 56 and a circumferential edge 53a of the attachment port 53. Accordingly, a space between the flange 56 and the circumferential edge 53a of the attachment port 53 is sealed by the rubber packing 57.

A connector 59 is connected to a terminal 58 of the light source 33.

As shown in FIG. 4 and FIG. 5, in the housing wall section 42, the ventilation section 43 is formed above the attachment/detachment section 55 of the light source 33 (i.e., the attachment port 53 of the housing wall section 42) in the vicinity of the attachment/detachment section 55. The ventilation section 43 is formed in a cylindrical shape, and horizontally extends toward the front of the vehicle body. As a base end portion 43a of the ventilation section 43 is opened and a tip portion 43b is opened, a ventilation port 61 configured to open the inside of the ventilation section 43 is formed. The ventilation port 61 of the ventilation section 43 is in communication with the internal space 51 of the lamp body 27.

As the ventilation port 61 of the ventilation section 43 is in communication with the internal space 51, air can enter and exit the internal space 51 and the outside 52 of the lamp body 27 by flowing air through the ventilation section 43. Accordingly, occurrence of fogging in the internal space 51 of the lamp body 27 due to moisture can be prevented.

Further, the reason for forming the ventilation section 43 in the vicinity of the attachment/detachment section 55 of the light source 33 will be described below in detail.

In addition, the ventilation section 43 has a step portion 64 formed on an outer circumferential upper section of the tip portion 43b.

The waterproof wall 44 is formed to cover an outer circumference of the ventilation section 43. The waterproof wall 44 extends from the housing wall section 42 toward the front of the vehicle body along the ventilation section 43, and an opening section 66 is opened in a tip portion 44a. The waterproof wall 44 is disposed with a first gap S1 with respect to the ventilation section 43 to surround the periphery of the ventilation section 43 from the outside in the radial direction.

Here, an axis L2 of the waterproof wall 44 is disposed below an axis L1 of the ventilation section 43. Accordingly, the first gap S1 is formed such that a lower side of the ventilation section 43 is larger than an upper side thereof.

In addition, the waterproof wall 44 has a concave groove 74 formed in a lower section 44b of the tip portion 44a. The concave groove 74 is open toward the front of the vehicle body.

The pair of attachment bosses 45 and 46 or the positioning protrusion 47 is formed on the housing wall section 42 outside the waterproof wall 44 in the radial direction.

The pair of attachment bosses 45 and 46 are formed inside the waterproof wall 44 in the vehicle width direction (on the right side). One of the pair of attachment bosses 45 and 46 (i.e., the first attachment boss 45) is formed on a left upper side of the waterproof wall 44. In addition, the other of the pair of attachment bosses 45 and 46 (i.e., the second attachment boss 46) is formed on a left lower side of the waterproof wall 44.

The first attachment boss 45 protrudes toward the front of the vehicle body along the waterproof wall 44, and a screw hole 45a is coaxially formed in a tip portion thereof. Like the first attachment boss 45, the second attachment boss 46 protrudes toward the front of the vehicle body along the waterproof wall 44, and a screw hole 46a is coaxially formed in a tip portion thereof.

The positioning protrusion 47 is formed outside the waterproof wall 44 in the vehicle width direction (on the left side). The positioning protrusion 47 protrudes toward the front of the vehicle body along the waterproof wall 44, and a positioning pin 47a is formed on a tip portion thereof. The positioning pin 47a protrudes toward the front of the vehicle body coaxially with the positioning protrusion 47.

The cap 35 is attached to the tip portion 43b of the ventilation section 43. The cap 35 has a cap circumferential wall section 76 and a cap wall section 77. The cap circumferential wall section 76 has a tip portion 76a that is open, and is formed in a cylindrical shape that can be fitted onto the tip portion 43b of the ventilation section 43. As the cap circumferential wall section 76 is fitted onto the tip portion 43b of the ventilation section 43, the entire region of the outer circumferential surface of the tip portion 43b is covered with the cap circumferential wall section 76 in the radial direction.

The cap wall section 77 is formed on a base end 76b of the cap circumferential wall section 76. The cap wall section 77 is formed in a disk shape, and an outer circumferential edge 77a is connected to the base end 76b of the cap circumferential wall section 76. That is, the cap circumferential wall section 76 has the base end 76b that is covered with the cap wall section 77.

Here, in the cap 35, in a state in which the cap circumferential wall section 76 is fitted onto the tip portion 43b of the ventilation section 43, an upper section 76c of the cap circumferential wall section 76 is attached to the step portion 64 of the ventilation section 43. Accordingly, a space between the upper section 76c of the cap circumferential wall section 76 and the step portion 64 of the ventilation section 43 is closed. In this state, the tip portion 43b of the ventilation section 43 is covered with the cap 35, and the ventilation port 61 of the ventilation section 43 is covered with the cap wall section 77 from the front of the vehicle body.

As the upper section 76c of the cap circumferential wall section 76 is attached to the step portion 64 of the ventilation section 43, an axis L3 of the cap 35 is disposed coaxially with the axis L2 of the waterproof wall 44. That is, the axis L3 of the cap 35 is disposed below the axis L1 of the ventilation section 43.

In this state, the cap wall section 77 is disposed in front of the vehicle body with a second gap S2 with respect to the tip portion 43b of the ventilation section 43. In addition, the cap circumferential wall section 76 is disposed on the tip portion 43b of the ventilation section 43 so as to have a third gap S3 in the radial direction with respect to a portion 43c except the step portion 64. Further, the tip portion 76a of the cap circumferential wall section 76 is disposed so as to have a fourth gap S4 with respect to the housing wall section 42.

In addition, the cap circumferential wall section 76 is disposed so as to have a fifth gap S5 with respect to the waterproof wall 44 in the radial direction.

Here, a space between the upper section 76c of the cap circumferential wall section 76 and the upper section (i.e., the step portion 64) of the ventilation section 43 is closed. Accordingly, infiltration of water on the side of the upper section 76c of the cap circumferential wall section 76 and the step portion 64 of the ventilation section 43 into the ventilation port 61 of the ventilation section 43 from the space between the upper section 76c of the cap circumferential wall section 76 and the step portion 64 of the ventilation section 43 can be prevented.

The opening section 66 of the tip portion 44a of the waterproof wall 44 is covered with the water-resistant cover 37. The water-resistant cover 37 includes a shielding wall 81, a cylindrical wall 82, a pair of positioning sections 83 and 84, and a pair of fixing sections 85 and 86.

The shielding wall 81 is disposed in front of the vehicle body at an interval with respect to the tip portion 44a of the waterproof wall 44. The shielding wall 81 is formed in a circular shape in a state in which an outer edge 81c overhangs outward in the radial direction with respect to the waterproof wall 44. The shielding wall 81 has an upper drain port 91 and a lower drain port 92. The upper drain port 91 is formed in an upper section 81a of the shielding wall 81 adjacent to the outer edge 81c, and formed in a curved shape along the outer edge 81c. The lower drain port 92 is formed in a lower section 81b of the shielding wall 81 adjacent to the outer edge 81c, and formed in a curved shape along the outer edge 81c.

The cylindrical wall 82 is formed on the outer edge 81c of the shielding wall 81. The cylindrical wall 82 extends from the outer edge 81c of the shielding wall 81 toward the rear of the vehicle body along the waterproof wall 44 in a direction of the axis L2 of the waterproof wall 44. The cylindrical wall 82 is disposed at an interval with respect to the tip portion 44a of the waterproof wall 44 in the radial direction.

Figure 6:
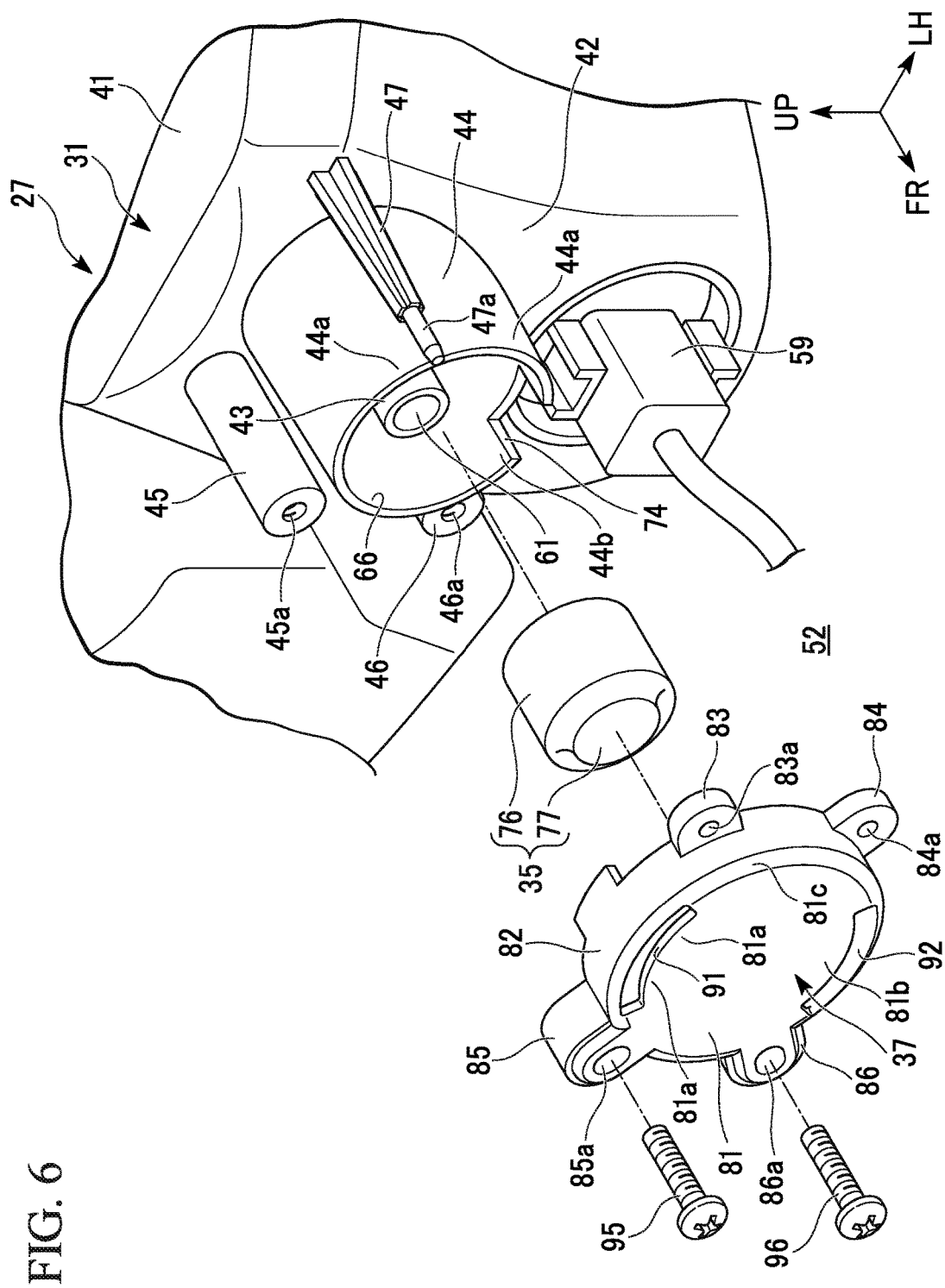
FIG. 6 is an exploded perspective view showing the lamp body in FIG. 3 according to the embodiment of the present invention.
Figure 7:
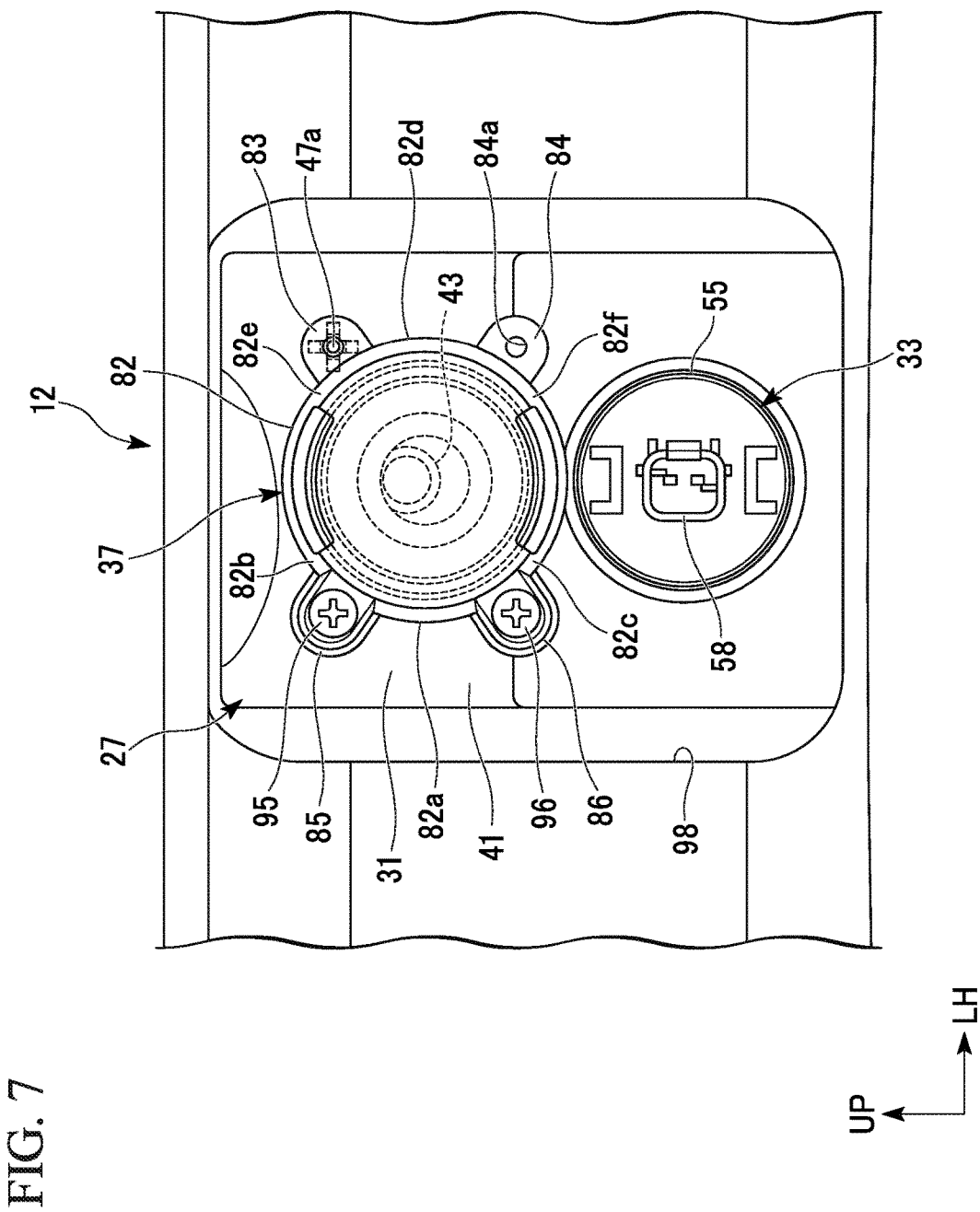
FIG. 7 is a rear view of the lamp body according to the embodiment of the present invention when the lamp body is seen from the front of the vehicle body.

As shown in FIG. 6 and FIG. 7, one of the pair of fixing sections 85 and 86 (specifically, the first fixing section 85) is formed on a right upper section 82b of a right side portion 82a of the cylindrical wall 82. The other of the pair of fixing sections 85 and 86 (specifically, the second fixing section 86) is formed on a right lower section 82c of the right side portion 82a of the cylindrical wall 82.

The first fixing section 85 protrudes from the right upper section 82b of the cylindrical wall 82 toward the outside of the cylindrical wall 82 in the radial direction. An attachment hole 85a is formed in the first fixing section 85. A bolt 95 is inserted into the attachment hole 85a of the first fixing section 85.

The second fixing section 86 protrudes from the right lower section 82c of the cylindrical wall 82 toward the outside of the cylindrical wall 82 in the radial direction. An attachment hole 86a is formed in the second fixing section 86. A bolt 96 is inserted into the attachment hole 86a of the second fixing section 86.

One of the pair of positioning sections 83 and 84 (specifically, the first positioning section 83) is formed on a left upper section 82e in a left side portion 82d of the cylindrical wall 82. The other of the pair of positioning sections 83 and 84 (specifically, the second positioning section 84) is formed on a left lower section 82f in the left side portion 82d of the cylindrical wall 82.

The first positioning section 83 protrudes from the left upper section 82e of the cylindrical wall 82 toward the outside of the cylindrical wall 82 in the radial direction. A positioning hole 83a is formed in the first positioning section 83. The positioning hole 83a is fitted onto the positioning pin 47a of the positioning protrusion 47. The second positioning section 84 protrudes from the left lower section 82f of the cylindrical wall 82 toward the outside of the cylindrical wall 82 in the radial direction. A positioning hole 84a is formed in the second positioning section 84.

As shown in FIG. 2 and FIG. 5, the water-resistant cover 37 is shared by both of the left lamp body 27 (i.e., the lamp body 27) and the right lamp body 28. When the water-resistant cover 37 is used in the right lamp body 28, the water-resistant cover 37 is used in a state in which it is rotated 180 degrees in the vehicle width direction. Accordingly, the positioning hole 84a of the second positioning section 84 is fitted onto the positioning pin 47a of the positioning protrusion 47 of the right lamp body 28.

Further, an example in which the water-resistant cover 37 is shared by both of the left lamp body 27 and the right lamp body 28 will be described below in detail.

Figure 8:
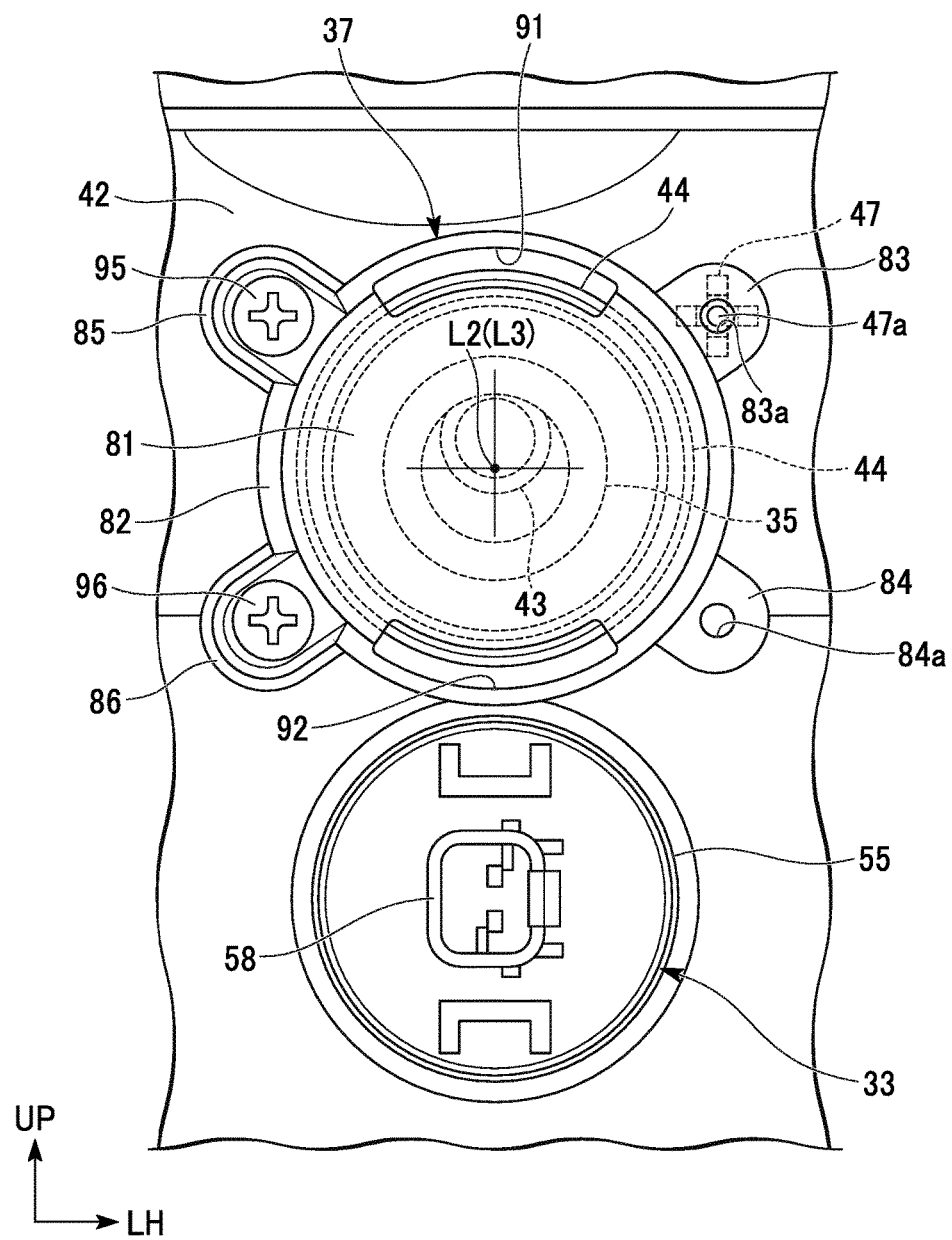
FIG. 8 is a rear view of the lamp body, showing major parts of the lamp body in FIG. 7 according to the embodiment of the present invention.

As shown in FIG. 8, the upper drain port 91 is formed between the first fixing section 85 and the first positioning section 83. That is, the upper drain port 91 is installed at a different position from the first fixing section 85 in the circumferential direction. In addition, the upper drain port 91 is installed at a different position from the first positioning section 83 in the circumferential direction.

The lower drain port 92 is formed between the second fixing section 86 and the second positioning section 84. That is, the lower drain port 92 is disposed at a different position from the second fixing section 86 in the circumferential direction.

In addition, the lower drain port 92 is installed at a different position from the second positioning section 84 in the circumferential direction.

In this way, the upper drain port 91 is disposed at a different position from the first fixing section 85 in the circumferential direction. In addition, the lower drain port 92 is installed at a different position from the second fixing section 86 in the circumferential direction. Accordingly, the first fixing section 85 and the second fixing section 86 continue from the cylindrical wall 82 to the shielding wall 81 in the circumferential direction.

That is, the first fixing section 85 and the second fixing section 86 are strongly supported by the cylindrical wall 82 or the shielding wall 81.

As shown in FIG. 6 and FIG. 8, the positioning hole 83a of the first positioning section 83 is inserted onto the positioning pin 47a of the positioning protrusion 47. In addition, the first fixing section 85 is fixed to the first attachment boss 45 using the bolt 95. Further, the second fixing section 86 is fixed to the second attachment boss 46 using the bolt 96. Accordingly, the water-resistant cover 37 is fixed to the housing wall section 42 via the first attachment boss 45, the second attachment boss 46 and the positioning protrusion 47.

Here, the first fixing section 85 and the second fixing section 86 are strongly supported by the cylindrical wall 82 or the shielding wall 81. Accordingly, in a state in which the water-resistant cover 37 is attached to the housing wall section 42, attachment rigidity of the water-resistant cover 37 is increased.

As shown in FIG. 5, the water-resistant cover 37 is fixed to the housing wall section 42. In this state, the shielding wall 81 of the water-resistant cover 37 is disposed in front of the vehicle body with a sixth gap S6 with respect to the tip portion 44a of the waterproof wall 44 (i.e., the opening section 66). In addition, the cylindrical wall 82 is disposed with a seventh gap S7 with respect to the tip portion 44a of the waterproof wall 44 in the radial direction.

Here, the internal space 51 of the lamp body 27 is in communication with the outside 52 through the ventilation port 61 of the ventilation section 43. The ventilation port 61 of the ventilation section 43 is in communication with the outside 52 of the lamp body 27 via the second gap S2, the third gap S3, the fourth gap S4, the first gap S1, the fifth gap S5, the sixth gap S6 and the seventh gap S7.

Accordingly, air can enter and exit the internal space 51 and the outside 52 of the lamp body 27 by flowing through the ventilation port 61, the second gap S2, the third gap S3, the fourth gap S4, the first gap S1, the fifth gap S5, the sixth gap S6 and the seventh gap S7. Accordingly, occurrence of fogging in the lamp body due to moisture can be prevented.

As shown in FIG. 5 and FIG. 8, the upper drain port 91 and the lower drain port 92 are disposed further outside than the waterproof wall 44 in the radial direction when seen in a direction of the axis L2 of the waterproof wall 44. In this state, it is conceivable that water from the outside 52 of the lamp body 27 will infiltrate into the seventh gap S7 between the tip portion 44a of the waterproof wall 44 and the cylindrical wall 82 of the water-resistant cover 37 as shown by an arrow A.

Here, the upper drain port 91 and the lower drain port 92 are installed in the waterproof wall 44. Accordingly, the water infiltrating into the seventh gap S7 as shown by the arrow A can be drained from the upper drain port 91 and the lower drain port 92 (in particular, the lower drain port 92). Accordingly, infiltration of the water from the ventilation port 61 into the internal space 51 of the lamp body 27 can be prevented.

Here, the waterproof wall 44 is formed to surround the periphery of the cap 35 in the radial direction. In addition, the upper drain port 91 and the lower drain port 92 are formed outside the waterproof wall 44 in the radial direction.

That is, the upper drain port 91 and the lower drain port 92 are installed at positions separated from the cap 35, in particular, in the radial direction.

Accordingly, for example, when water infiltrates into the space between the waterproof wall 44 and the water-resistant cover 37 from the outside 52 of the lamp body 27 via the upper drain port 91 and the lower drain port 92, the water that has infiltrated can be prevented from directly coming in contact with the cap 35. Accordingly, removal of the cap 35 from the ventilation section 43 due to the direct contact of the water with the cap 35 can be prevented.

In addition, the shielding wall 81 of the water-resistant cover 37 is disposed in front of the vehicle body with the sixth gap S6 with respect to the tip portion 44a of the waterproof wall 44. Further, the cylindrical wall 82 is formed on the outer edge 81c of the shielding wall 81. The cylindrical wall 82 extends along the tip portion 44a of the waterproof wall 44.

Accordingly, a labyrinth structure (a labyrinthine structure) in which the seventh gap S7, the sixth gap S6 and the fifth gap S5 form a U shape is formed by the cylindrical wall 82, the shielding wall 81 and the tip portion 44a of the waterproof wall 44. The seventh gap S7 is in communication with the outside 52 of the lamp body 27.

Water infiltrates into the seventh gap S7 from the outside 52 of the lamp body 27 as shown by the arrow A. The water infiltrating into the seventh gap S7 can be prevented from entering the opening section 66 of the waterproof wall 44 by the labyrinth structure of the seventh gap S7, the sixth gap S6 and the fifth gap S5. Accordingly, infiltration of water from the ventilation port 61 into the internal space 51 of the lamp body 27 can be prevented.

Further, the cylindrical wall 82 extends from the shielding wall 81, and the upper drain port 91 and the lower drain port 92 are formed in the shielding wall 81. That is, the cylindrical wall 82 is formed along the upper drain port 91 and the lower drain port 92. Accordingly, an area of the water-resistant cover 37 at which the upper drain port 91 and the lower drain port 92 are formed (in particular, the upper section 81a and the lower section 81b of the shielding wall 81) is reinforced by the cylindrical wall 82. Accordingly, rigidity of the water-resistant cover 37 is secured by the cylindrical wall 82.

As shown in FIG. 2, the lamp body 27 (i.e., the left lamp body 27) is attached to the vehicle Ve on the left side, and the right lamp body 28 is attached to the vehicle Ve on the right side. In this case, the water-resistant cover 37 is preferably shared by the right lamp body 28 and the left lamp body 27. As the water-resistant cover 37 is shared by both of the left and right lamp bodies 27 and 28, reduction in the number of parts or the like can be achieved.

Here, as shown in FIG. 8, the upper drain port 91 and the lower drain port 92 are formed on the shielding wall 81.

Accordingly, when the water-resistant cover 37 is attached to the lamp body 27 in a state in which the lamp body 27 is attached to the vehicle Ve on the left side, one of the upper drain port 91 and the lower drain port 92 (specifically, the lower drain port 92) of the water-resistant cover 37 is disposed at a lower part.

In addition, when the water-resistant cover 37 is attached to the right lamp body 28 in a state in which the right lamp body 28 (see FIG. 2) is attached to the vehicle Ve on the right side, the other of the upper drain port 91 and the lower drain port 92 (specifically, the upper drain port 91) is disposed at a lower part.

Here, as shown in FIG. 2 and FIG. 6, when the water-resistant cover 37 is attached to the left lamp body 27 of the vehicle Ve, the first fixing section 85 is attached to the first attachment boss 45, and the second fixing section 86 is attached to the second attachment boss 46. In addition, the positioning hole 83a of the first positioning section 83 is positioned on the positioning pin 47a of the positioning protrusion 47.

Meanwhile, when the water-resistant cover 37 is attached to the right lamp body 28 of the vehicle Ve, the water-resistant cover 37 is used in a state in which it is rotated 180 degrees in the vehicle width direction. That is, the second fixing section 86 is attached to the first attachment boss 45, and the first fixing section 85 is attached to the second attachment boss 46. In addition, the positioning hole 84a of the second positioning section 84 is positioned on the positioning pin 47a of the positioning protrusion 47.

In this way, the water-resistant cover 37 can be shared by the lamp body 27 on the left side in the vehicle width direction and the right lamp body 28 on the right side in the vehicle width direction. Accordingly, reduction in the number of parts or the like can be achieved. Further, erroneous assembly of the water-resistant cover 37 to the lamp body 27 on the left side in the vehicle width direction and the right lamp body 28 on the right side in the vehicle width direction can be prevented.

In addition, as the upper drain port 91 is installed in the upper section 81a of the shielding wall 81 and the lower drain port 92 is installed in the lower section 81b of the shielding wall 81, the lower drain port 92 can be used for drainage and the upper drain port 91 can be used for air intake. Accordingly, the water infiltrating into the water-resistant cover 37 is smoothly discharged to the outside of the water-resistant cover 37.

As shown in FIG. 7, the ventilation section 43 or the water-resistant cover 37 is formed in the housing wall section 42 of the lamp body 27 above the attachment/detachment section 55 of the light source 33 (i.e., the attachment port 53 (see FIG. 5)) and in the vicinity of the attachment/detachment section 55.

Here, a working hole 98 for attachment and detachment of the light source 33 of the lamp body 27 is formed in the vehicle body rear structure 12. Here, the ventilation section 43 or the water-resistant cover 37 is installed in the vicinity of the attachment/detachment section 55 of the light source 33 of the lamp body 27. Accordingly, maintenance/inspection (maintenance) of the ventilation section 43 (the ventilation port 61) or the water-resistant cover 37 can be easily performed using the working hole 98.

Meanwhile, since the lamp body 27 is placed at a place facing the working hole 98, it is conceivable that the water infiltrating from the working hole 98 will enter the internal space 51 (see FIG. 4) of the lamp body 27. Here, the water-resistant cover 37 is installed on the lamp body 27. Accordingly, the water infiltrating from the working hole 98 can be prevented from entering the internal space 51 of the lamp body 27 by the water-resistant cover 37.

Further, the technical scope of the present invention is not limited to the above-mentioned embodiment and various modifications may be made without departing from the scope of the present invention.

For example, while the example in which the left and right lamp bodies 27 and 28 are provided in the vehicle body rear structure 12 has been described in the embodiment, there is no limitation thereto. As another example, for example, the left and right lamp bodies 27 and 28 may also be provided in the vehicle body front structure.

In addition, while the example in which the left and right lamp bodies 27 and 28 are used as the back lamp 26 has been described in the embodiment, there is no limitation thereto. As another example, for example, the left and right lamp bodies 27 and 28 may also be used for another lamp such as a brake lamp, a direction indicator, a width indicator, a headlight, or the like.

Further, while the example in which the waterproof wall 44 is formed in a cylindrical shape and the concave groove 74 is formed in the lower section 44b of the tip portion 44a has been described in the embodiment, there is no limitation thereto. As another example, for example, the waterproof wall 44 may also be formed in a U shape that is open downward.

In addition, while the example in which the concave groove 74 is formed in the lower section 44b of the tip portion 44a of the waterproof wall 44 has been described in the embodiment, the concave groove 74 may not be formed in the lower section 44b of the tip portion 44a.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body structure comprising:
   a ventilation section that forms a ventilation port through which air in an internal space of a lamp body enters and exits;
   a cap that covers the ventilation section;
   a waterproof wall that surrounds a periphery of the cap; and
   a water-resistant cover that covers an opening section of the waterproof wall and an outer circumference of the waterproof wall,
   wherein the water-resistant cover comprises a drain port further outside than the waterproof wall in a radial direction when seen in an axial direction of the waterproof wall, and
   a space between an upper section of a circumferential wall section of the cap and the ventilation section is closed.

2. The vehicle body structure according to claim 1, wherein the water-resistant cover comprises:
   a shielding wall that covers the opening section of the waterproof wall; and
   a cylindrical wall extending from the shielding wall in the axial direction of the waterproof wall, and
   the drain port is installed in the shielding wall.

3. The vehicle body structure according to claim 2, wherein the cylindrical wall comprises a fixing section fixed to the lamp body, and
   the drain port is installed at a different position from the fixing section in a circumferential direction.

4. The vehicle body structure according to claim 2, wherein the drain port is installed at two places in an upper section and a lower section of the shielding wall.

5. The vehicle body structure according to claim 1, wherein the ventilation port is installed in a vicinity of an attachment/detachment section of a light source installed in the lamp body.

6. The vehicle body structure according to claim 1, wherein an axis of the waterproof wall is arranged so as to be offset downward with respect to an axis of the ventilation section.

\* \* \* \* \*